Patented June 20, 1944

2,351,949

UNITED STATES PATENT OFFICE 2,351,949

HEAT-TREATED ROSIN SIZE

Edmund A. Georgi, Wilmington, Del., assignor to Hercules Powder Company, Wilmington, Del., a corporation of Delaware No Drawing. Application August 14, 1942, Serial No. 454,837

15 Claims. (Cl. 260—105)

This invention relates to improved rosin sizes, and in particular concerns a method of heat treating an alkali metal salt of rosin.

Rosin, which may or may not have been treated in any of a number of ways to remove the color bodies therefrom, may be completely or partially saponified with an alkali, such as sodium carbonate or sodium hydroxide, and the resulting mixture may be used in paste form or converted by drum or spray drying to form a fine dry powder.

Saponified wood rosin, known as wood rosin size, thus prepared has the tendency to deposit a crystalline product, known in the art as "3:1 salt," during storage or upon dilution with water. This "3:1 salt" is a water-insoluble double salt consisting of three molecules of abietic acid and one molecule of an alkali metal abietate. Gum rosin, when used in saponified form in paper size, exhibits a tendency to form a great deal of foam on the paper machine. Foaming is objectionable as it interferes with efficient operation of the paper machine and causes paper not only to have a poor structure but the sizes which foam will not disperse readily.

Now in accordance with this invention, there has been found a method of improving an alkali metal salt of rosin to substantially reduce any tendency that may be present to form 3:1 salt, and to further eliminate any tendency which may be present to foam. Furthermore, these advantages have been accomplished by the heat treatment without any substantial increase in the viscosity of its solution. The invention thus comprises heating an alkali metal salt of rosin with water at a pressure from about 500 lbs. per square inch to about 2500 lbs. per square inch and at a temperature from about 250° C. to about 350° C. for a period from about ten minutes to about three hours.

It has been found that if a dispersion of an alkali metal salt of rosin in water, such as a paste size, containing from about 50% to about 85% solids, is heated under a pressure of from about 500 lbs. per square inch to about 2500 lbs. per square inch at a temperature of from about 250° C. to about 350° C. and for a time sufficient to effect an isomerization of the resinates present, and preferably at a pressure from about 750 to about 1300 lbs. per square inch and a temperature from about 270° C. to about 305° C., the thus treated alkali metal salt will be free of the tendency to form 3:1 salt on storage or on dilution, will be free of foaming tendencies, and will have undergone no increase in viscosity as a result of the heat treatment.

The following examples will illustrate this invention. It is to be understood, however, that such examples are presented merely as illustration of the invention and are not to be construed as limiting the same.

*Example 1*

An aqueous dispersion of a sodium salt of K wood rosin having a solids content of 70%, the sodium salt having a free rosin content of 17%, was subjected to a treatment by heating to about 70° C.–80° C. and pumping at 2000 lbs. per square inch to a preheater heated by about 150 lbs. steam pressure and from there to a treating unit. This latter unit consisted of a cylindrical shell in which Dowtherm vapors were circulated over a coil, through which passed the dispersion. The temperature of the Dowtherm vapors was regulated by strip heaters governed through a variac. The rate of flow was controlled so that the dispersion was subjected to a temperature of 300° C. at a pressure of 1250 lbs. per square inch for 120 minutes. The dispersion was then cooled and discharged from the system under an atmosphere of nitrogen. The characteristics of the sodium salt of the K wood rosin before and after heat treatment of the 70% dispersion were as follows:

|   |   | Percent free alkali | Percent free rosin | Sp. rot. | Percent unsap. |
|---|---|---|---|---|---|
|   |   |   |   | *Degrees* |   |
| 1 | Original | 1.6 | 17.0 | −0.6 | 5.8 |
| 2 | Heat-treated | 6.0 | 20.0 | +9.6 | 16.2 |

There was no formation of 3:1 salt in a 3% emulsion of the heat-treated product on standing.

*Example 2*

The process of Example 1 was duplicated with the exception that the heating was controlled so that the dispersion was subjected to a temperature of 300° C. and a pressure of 1250 lbs. per square inch for 75 minutes instead of 120 minutes. There again was formed a pale product which showed no 3:1 salt precipitation in a 3% emulsion. The characteristics of the sodium salt of the K wood rosin before and after heat treatment of the 70% dispersion were as follows:

|   |   | Percent free | Percent free | Sp. rot. | Percent unsap. |
|---|---|---|---|---|---|
| 1 | Original | 1.6 | 17.0 | −0.6 | 5.8 |
| 2 | Heat-treated | 5.0 | 17.1 | +1.2 | 15.3 |

Example 3

An aqueous dispersion of a sodium salt of B wood rosin containing 60% solids, the sodium salt having a free rosin content of 6%, was treated in the same manner as Example 1 except for 15 minutes at 270° C., the pressure being about 800 lbs. per square inch. The heat-treated salt when used for sizing paper in the form of its 3% emulsion showed improved sizing properties as illustrated in the following table:

| | Dominant wave length | Excitation purity | Sizing (fluorescence test) | News ink |
|---|---|---|---|---|
| 1 Original | 573 | 21.5 | 41 | 74 |
| 2 Heat-treated | 578 | 14.1 | 44 | 101 |

It will be noted that the excitation purity value is 33% lower in the heat-treated sample, the yellow color has been destroyed and the sizing is improved.

Example 4

An aqueous dispersion of a sodium salt of B wood rosin containing 75% solids, the sodium salt having a free rosin content of 6%, was treated in the same manner as Example 1 except for 45 minutes at 302° C. and a pressure of about 1300 lbs. per square inch. The characteristics of the heat-treated salt when used for sizing paper in the form of its 3% emulsion showed improved sizing properties, as illustrated in the following table:

| | Dominant wave length | Excitation purity | Sizing (fluorescence test) | News ink |
|---|---|---|---|---|
| 1 Original | 573 | 21.9 | 44 | 74 |
| 2 Heat-treated | 580 | 14.9 | 43 | 91 |

Example 5

An aqueous dispersion of a sodium salt of gum rosin containing 70% solids, the sodium salt having a free rosin content of 30%, was treated in the same manner as Example 1 except for 30 minutes at 300° C., the pressure being about 1250 lbs. per square inch. The characteristics of the sodium salt of gum rosin before and after heat treatment of the 70% dispersion were as follows:

| | Free alkali | Rosin | Sp. rot. | Viscosity sec. |
|---|---|---|---|---|
| 1 Original | 0.2 | 30.8 | +23.4 | 681 |
| 2 Heat-treated | 0.2 | 21.6 | +2.0 | 285 |

As will be apparent from the above, although examples have been shown of the heat treatment of K and B wood rosin sizes and gum rosin size, these alkali metal salts of rosin were used for purposes of illustration and not by way of limitations.

The process of the present invention is applicable to any alkali metal salt of a rosin. The rosin may be either partially or completely saponified with an alkali. The resulting mixture is referred to herein either as an alkali metal salt of rosin or as saponified rosin size.

While in the examples a continuous method of operation has been shown, it is not intended thereby to limit this invention. Rosin size may be heated, for example, in an autoclave according to the method of this invention, and equally desirable results obtained. Any other suitable method of heating the rosin size may be employed, if desired. In practice, as illustrated in the examples, it has been found that a convenient method of introducing the rosin size into the heating unit is to pump it into the unit after it has been heated to a temperature at which the rosin size is sufficiently fluent for pumping, such as 70° C. to about 80° C. The rosin size, however, may be introduced in other methods which will be obvious to those skilled in the art.

In the carrying out of the heat treatment according to the method of this invention as herein described, it is not intended to limit this method to any specific apparatus. The apparatus may be varied as desired.

Heat-treated alkali metal salts of rosin produced by this invention are capable of utilization wherever sizes are used today, and particularly where it is necessary that an easily emulsifiable size, which does not form 3:1 salt is desired. The improved rosin size also acquires the ability to kill most of the foam ordinarily met with in paper mill practice. Furthermore, the alkali metal salt of rosin after being improved by this method does not show any substantial increase in viscosity in its solutions as a result of the heat treatment. This is particularly desirable because ordinarily the heat-treating of rosin increases its viscosity and increases the difficulties of handling when used in paper sizing.

What I claim and desire to protect by Letters Patent is:

1. The process of improving an alkali metal salt of rosin which comprises heating an alkali metal salt of rosin with water at a temperature from about 250° C. to about 350° C. for a period from about 10 minutes to about 3 hours and at a pressure from about 500 lbs. per square inch to about 2500 lbs. per square inch.

2. The process of improving an alkali metal salt of rosin which comprises heating an aqueous dispersion of an alkali metal salt of rosin containing from about 50% to about 85% solids, at a temperature from about 250° C. to about 350° C. for a period from about 10 minutes to about 3 hours and at a pressure from about 500 lbs. per square inch to about 2500 lbs. per square inch.

3. The process of improving an alkali metal salt of rosin which comprises heating an aqueous dispersion of an alkali metal salt of rosin containing from about 50% to about 85% solids at a temperature from about 270° C. to about 305° C. for a period from about 10 minutes to about 3 hours and at a pressure from about 750 lbs. per square inch to about 1300 lbs. per square inch.

4. The process of improving a sodium salt of rosin which comprises heating a sodium salt of rosin with water at a temperature from about 250° C. to about 350° C. for a period from about 10 minutes to about 3 hours, and at a pressure from about 500 lbs. per square inch to about 2500 lbs. per square inch.

5. The process of improving a sodium salt of rosin which comprises heating an aqueous dispersion of a sodium salt of rosin containing from about 50% to about 85% solids at a temperature from about 270° C. to about 305° C. for a period from about 10 minutes to about 3 hours and at a pressure from about 750 lbs. per square inch to about 1300 lbs. per square inch.

6. The process of improving an alkali metal salt of wood rosin which comprises heating an alkali metal salt of wood rosin with water at a temperature from about 250° C. to about 350° C. for a period from about 10 minutes to about 3 hours and at a pressure from about 500 lbs. per square inch to about 2500 lbs. per square inch.

7. The process of improving an alkali metal salt of wood rosin which comprises heating an aqueous dispersion of an alkali metal salt of wood rosin containing from about 50% to about 85% solids at a temperature from about 250° C. to about 350° C. for a period from about 10 minutes to about 3 hours and at a pressure from about 500 lbs. per square inch to about 2500 lbs. per square inch.

8. The process of improving an alkali metal salt of wood rosin which comprises heating an aqueous dispersion of an alkali metal salt of wood rosin containing from about 50% to about 85% solids at a temperature from about 270° C. to about 305° C. for a period from about 10 minutes to about 3 hours and at a pressure from about 750 lbs. per square inch to about 1300 lbs. per square inch.

9. The process of improving an alkali metal salt of wood rosin which comprises heating an aqueous dispersion of an alkali metal salt of wood rosin containing from about 60% to about 80% solids at a temperature from about 270° C. to about 305° C. for a period from about 10 minutes to about 3 hours and at a pressure from about 750 lbs. per square inch to about 1300 lbs. per square inch.

10. The process of improving a sodium salt of wood rosin which comprises heating an aqueous dispersion of a sodium salt of wood rosin containing from about 60% to about 80% solids at a temperature from about 270° C. to about 305° C. for a period from about 10 minutes to about 3 hours and at a pressure from about 750 lbs. per square inch to about 1300 lbs. per square inch.

11. The process of improving an alkali metal salt of gum rosin which comprises heating an alkali metal salt of gum rosin with water at a temperature from about 250° C. to about 350° C. for a period from about 10 minutes to about 3 hours and at a pressure from about 500 lbs. per square inch to about 2500 lbs. per square inch.

12. The process of improving an alkali metal salt of gum rosin which comprises heating an aqueous dispersion of an alkali metal salt of gum rosin containing from about 50% to about 85% solids at a temperature from about 250° C. to about 350° C. for a period from about 10 minutes to about 3 hours and at a pressure from about 500 lbs. per square inch to about 2500 lbs. per square inch.

13. The process of improving an alkali metal salt of gum rosin which comprises heating an aqueous dispersion of an alkali metal salt of gum rosin containing from about 50% to about 85% solids at a temperature from about 270° C. to about 305° C. for a period from about 10 minutes to about 3 hours and at a pressure from about 750 lbs. per square inch to about 1300 lbs. per square inch.

14. The process of improving an alkali metal salt of gum rosin which comprises heating an aqueous dispersion of an alkali metal salt of gum rosin containing from about 60% to about 80% solids at a temperature from about 270° C. to about 305° C. for a period from about 10 minutes to about 3 hours and at a pressure from about 750 lbs. per square inch to about 1300 lbs. per square inch.

15. The process of improving a sodium salt of gum rosin which comprises heating an aqueous dispersion of a sodium salt of gum rosin containing from about 60% to about 80% solids at a temperature from about 270° C. to about 305° C. for a period from about 10 minutes to about 3 hours and at a pressure from about 750 lbs. per square inch to about 1300 lbs. per square inch.

EDMUND A. GEORGI.

CERTIFICATE OF CORRECTION.

Patent No. 2,351,949. June 20, 1944.

EDMUND A. GEORGI.

It is hereby certified that error appears in the printed specification of the above numbered patent requiring correction as follows: Page 1, second column, lines 50 to 52 inclusive, Example 2, in the heading to the table, second column thereof, for "Percent free" read --Percent free alkali--; and third column, same table, for "Percent free" read --Percent free rosin--; and that the said Letters Patent should be read with this correction therein that the same may conform to the record of the case in the Patent Office.

Signed and sealed this 15th day of August, A. D. 1944.

Leslie Frazer

(Seal) Acting Commissioner of Patents.